(No Model.)
H. C. HAM.
SEAT SUPPORT.
No. 534,643. Patented Feb. 26, 1895.
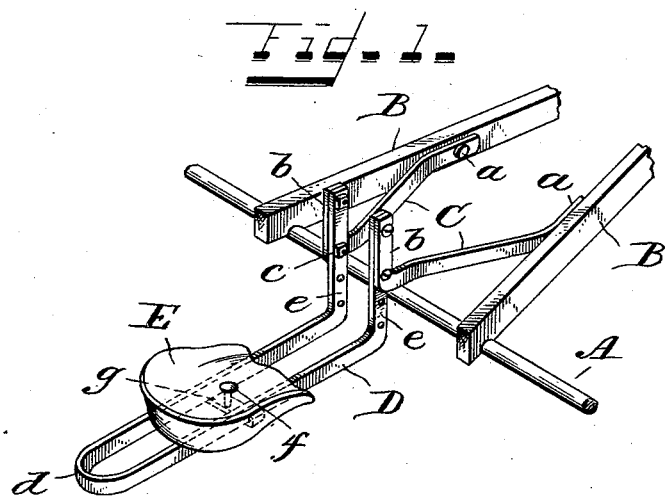
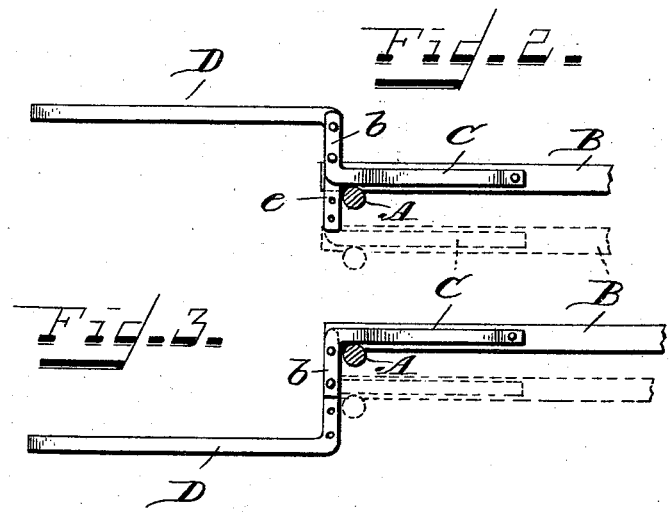
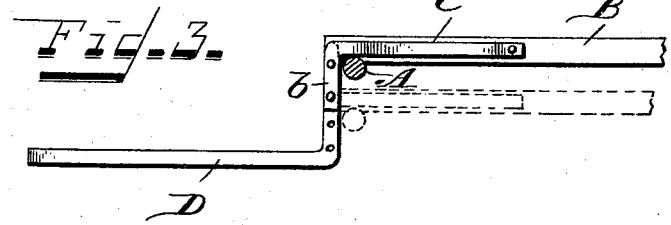
Witnesses.
J. Thomson Cross
George Heidman
Inventor.
Henry C. Ham
by Stem & Allen
Attorneys.
THE NORRIS PETERS CO., PHOTO-LITHO., WASHINGTON, D. C.

UNITED STATES PATENT OFFICE.

HENRY C. HAM, OF LIBERTY, INDIANA, ASSIGNOR TO THE RUDE BROTHERS MANUFACTURING COMPANY, OF SAME PLACE.

SEAT-SUPPORT.

SPECIFICATION forming part of Letters Patent No. 534,643, dated February 26, 1895.

Application filed December 21, 1894. Serial No. 532,518. (No model.)

*To all whom it may concern:*

Be it known that I, HENRY C. HAM, a citizen of the United States, residing at Liberty, in the county of Union and State of Indiana, have invented certain new and useful Improvements in Seat-Supports for Cultivators, of which the following is a full, clear, and exact description, reference being had to the accompanying drawings, forming part of this specification.

My invention relates to a new and improved seat for the driver to be used more particularly on cultivators although it can be equally well used upon other agricultural implements, to which such seats are applicable.

The invention consists of a novel construction and arrangement of parts whereby the seat may be raised or lowered within considerable limits, both readily and easily, and whereby the seat itself may be readily shifted or adjusted to and from the frame work of the machine, as desired.

In cultivators it is particularly desirable that a seat should be furnished for the driver that can be readily raised or lowered so that the operator may be able to reach the ground and uncover the corn and the like without leaving the seat and so that he may readily descend from the implement at any time. With a seat for the driver which can thus be readily raised and lowered, a boy can drive the implement as easily and well as a man.

In the drawings—Figure 1 is a perspective view of my improved seat supporter and the supporting frame of an agricultural implement. Fig. 2, is a side view of the supporter, showing two of the adjustments. Fig. 3, is a similar view showing two other adjustments.

A, is the arch or axle of the carrying wheels of the cultivator.

B, B, are, in this particular class of machine, the ends of the double tongue. Pivoted to the bars B, B, at the points $a, a$, one to each beam, are a pair of angle arms C, C. These arms are bent at right angles so as to be provided with vertically extending portions $b, b$. Secured to these angle arms by bolts and nuts shown at $c, c$, is a bracket D. This bracket is preferably made of a single piece of metal looped at its outer end $d$ and having vertically extending arms $e, e$. The seat E, is secured on this bracket by the pin or bolt $f$, which passes down through the seat and takes into a clip $g$ which grasps the outer lower edges of the bracket.

It will be seen that the seat can be readily shifted within the limits of the length of the horizontal portion of the bracket, to and from the axle or arch of the machine by loosening the bolt $f$ and shifting the seat along the bracket. The vertical arms $e, e$, of the bracket are provided with a series of holes for the adjustment of the seat up and down, while the seat holder rests upon the arch A of the cultivator at the connecting angle of the two parts of the holder.

One position of the seat is shown in Fig. 1 with the vertical portions of the bracket and the angle arms both extending upward. Another position of adjustment is shown in full lines in Fig. 2, the connection between the two parts of the holder being made in the inner series of the holes in the bracket with the points of the angle arms upward and the points of the bracket downward.

In dotted lines in Fig. 2, the highest position of the seat is shown, the connection being made in the outer series of holes in the bracket.

In Fig. 3, the lowest position of adjustment is shown with the arms of the bracket pointing upward and the vertical extensions of the angle arms pointing downward, the connection being made through the outer series of holes in the bracket and in the dotted lines in Fig. 3 is shown still another adjustment, the attachment being made through the inner series of the holes in the bracket. In this way it will be seen that the seat can be raised and lowered at a moment's notice. The parts are all united by bolts and nuts and the angle arms C, C, being similar in all respects, to turn the points down, all that it is necessary to do, is to loosen them, reverse them and change them from side to side. The bracket it will be seen can be readily reversed and the seat changed from one side of the bracket to the other. Resting as the holder does on the arch A, at the angle of union of the two parts, the pressure against the back part of the arch gives an additional support.

When the seat is not in use, the supporter may be thrown up out of the way on the pivots a, a.

Having thus described my invention, what I claim, and desire to secure by Letters Patent, is—

1. In a seat support for agricultural implements, the combination, of a reversible bracket, upon either side of which the seat is attached, provided with a vertically extending portion having a series of holes therein, and arms or other supports secured to the frame, with bolts to fasten the two together, substantially as shown and described.

2. In a seat support for agricultural implements, a reversible bracket with seat horizontally adjustable on either side thereof, and provided with a vertically extending portion, having a series of holes therein, and arms pivoted to the frame, with bolts to fasten the two together, substantially as shown and described.

3. In a seat support for agricultural implements, the combination, of a reversible bracket upon either side of which the seat is attached, provided with a vertically extending portion having a series of holes therein, and reversible angle arms secured to the frame, with bolts to secure the upright portions of each together, substantially as shown and described.

4. In a seat support for agricultural implements, a reversible bracket upon either side of which the seat is horizontally adjustable, said bracket being provided with vertically extending arms having a series of holes therein, in combination with a pair of reversible angle arms pivoted to the frame, with bolts to secure the upright portions of each together, substantially as shown and described.

HENRY C. HAM.

Witnesses:
HERBERT DARR,
JAMES H. DAVIS.